(12) United States Patent
Casser et al.

(10) Patent No.: US 12,260,576 B2
(45) Date of Patent: *Mar. 25, 2025

(54) UNSUPERVISED DEPTH PREDICTION NEURAL NETWORKS

(71) Applicant: Google LLC, Mountain View, CA (US)

(72) Inventors: Vincent Michael Casser, Cambridge, MA (US); Soeren Pirk, Palo Alto, CA (US); Reza Mahjourian, Austin, TX (US); Anelia Angelova, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/367,888

(22) Filed: Sep. 13, 2023

(65) Prior Publication Data

US 2023/0419521 A1 Dec. 28, 2023

Related U.S. Application Data

(63) Continuation of application No. 17/272,419, filed as application No. PCT/US2019/049643 on Sep. 5, 2019, now Pat. No. 11,783,500.

(Continued)

(51) Int. Cl.
*G06T 7/00* (2017.01)
*G06N 3/045* (2023.01)
(Continued)

(52) U.S. Cl.
CPC .............. *G06T 7/55* (2017.01); *G06N 3/045* (2023.01); *G06N 3/088* (2013.01); *G06T 3/18* (2024.01);
(Continued)

(58) Field of Classification Search
CPC ......... G06T 7/55; G06T 3/0093; G06T 7/248; G06T 2207/20081; G06T 2207/20084;
(Continued)

(56) References Cited

U.S. PATENT DOCUMENTS

2018/0053057 A1 2/2018 De Souza et al.
2018/0157918 A1 6/2018 Levkova et al.
(Continued)

FOREIGN PATENT DOCUMENTS

CN 106471526 3/2017
CN 108090436 5/2018
(Continued)

OTHER PUBLICATIONS

Ranjan, Anurag, et al. "Adversarial collaboration: Joint unsupervised learning of depth, camera motion, optical flow and motion segmentation." arXiv preprint arXiv:1805.09806 2.6 (May 24, 2018) (Year: 2018).*

(Continued)

*Primary Examiner* — Van D Huynh
(74) *Attorney, Agent, or Firm* — Fish & Richardson P.C.

(57) ABSTRACT

A system for generating a depth output for an image is described. The system receives input images that depict the same scene, each input image including one or more potential objects. The system generates, for each input image, a respective background image and processes the background images to generate a camera motion output that characterizes the motion of the camera between the input images. For each potential object, the system generates a respective object motion output for the potential object based on the input images and the camera motion output. The system processes a particular input image of the input images using a depth prediction neural network (NN) to generate a depth output for the particular input image, and updates the current (Continued)

values of parameters of the depth prediction NN based on the particular depth output, the camera motion output, and the object motion outputs for the potential objects.

19 Claims, 3 Drawing Sheets

Related U.S. Application Data (60) Provisional application No. 62/727,502, filed on Sep. 5, 2018.

(51) Int. Cl.
*G06N 3/088* (2023.01)
*G06T 3/18* (2024.01)
*G06T 7/246* (2017.01)
*G06T 7/55* (2017.01)

(52) U.S. Cl.
CPC .... *G06T 7/248* (2017.01); *G06T 2207/20081* (2013.01); *G06T 2207/20084* (2013.01)

(58) Field of Classification Search
CPC . G06T 2207/10016; G06T 2207/30244; G06T 7/73; G06T 7/579; G06N 3/045; G06N 3/088
USPC .......................................................... 382/100
See application file for complete search history.

(56) References Cited

U.S. PATENT DOCUMENTS

| | | | | |
|---|---|---|---|---|
| 2019/0139179 | A1* | 5/2019 | Wang | G06T 1/20 |
| 2019/0188863 | A1* | 6/2019 | Ray | G06T 7/251 |
| 2020/0349722 | A1* | 11/2020 | Schmid | G06T 7/269 |
| 2021/0326678 | A1* | 10/2021 | Smolyanskiy | G01S 7/417 |

FOREIGN PATENT DOCUMENTS

| | | |
|---|---|---|
| CN | 108389226 | 8/2018 |
| WO | WO 2018102697 | 6/2018 |
| WO | WO 2018102717 | 6/2018 |

OTHER PUBLICATIONS

Mahjourian et al., "Unsupervised learning of depth and ego-motion from monocular video using 3d geometric constraints," Proceedings of the IEEE Conference on Computer Vision and Pattern Recognition, 2018, 9pages (Year: 2018).*
Behl et al., "Bounding boxes, segmentations and object coordinates: How important is recognition for 3d scene flow estimation in autonomous driving scenarios?," Proceedings of the IEEE International Conference on Computer Vision, 2017, 2574-2583.
Casser et al., "Depth prediction without the sensors: Leveraging structure for unsupervised learning from monocular videos," Proceedings of the AAAI Conference on Artificial Intelligence, Jul. 2019, 7 pages.
Cordts et al., "The cityscapes dataset for semantic urban scene understanding," Proceedings of the IEEE conference on computer vision and pattern recognition, 2016, 3213-3223.
Deng et al., "Imagenet: A large-scale hierarchical image database," 2009 IEEE conference on computer vision and pattern recognition, Jun. 2009, 248-255.
Eigen et al., "Depth map prediction from a single image using a multi-scale deep network," arXiv preprint arXiv:1406.2283, Jun. 2014, 9 pages.
Garg et al., "Unsupervised cnn for single view depth estimation: Geometry to the rescue," European conference on computer vision, Oct. 2016, 740-756.
Geiger et al., "Vision meets robotics: The kitti dataset," The International Journal of Robotics Research, Sep. 2013, 32(11):1231-7.
Godard et al., "Digging into self-supervised monocular depth estimation," Proceedings of the IEEE/CVF International Conference on Computer, 2019, 3828-3838.
Godard et al., "Unsupervised monocular depth estimation with left-right consistency," Proceedings of the IEEE Conference on Computer Vision and Pattern Recognition, 2017, 270-279.
He et al., "Deep residual learning for image recognition," Proceedings of the IEEE conference on computer vision and pattern recognition, 2016, 770-778.
He et al., "Mask r-cnn," Proceedings of the IEEE international conference on computer vision, 2017, 2961-2969.
Hirschmuller et al., "Accurate and efficient stereo processing by semi-global matching and mutual information," 2005 IEEE Computer Society Conference on Computer Vision and Pattern Recognition, Jun. 2005, 2:807-814.
International Search Report and Written Opinion in International Appln. No. PCT/US2019/049643, mailed on Dec. 20, 2019, 16 pages.
Karsch et al., "Depth transfer: Depth extraction from video using non-parametric sampling," IEEE transactions on pattern analysis and machine intelligence, Apr. 2014, 36(11):2144-58.
Ladicky et al., "Discriminatively trained dense surface normal estimation," European conference on computer vision, Sep. 2014, 468-484.
Laina et al., "Deeper depth prediction with fully convolutional residual networks," 2016 Fourth international conference on 3D vision (3DV), Oct. 2016, 239-248.
Li et al., "A two-streamed network for estimating fine-scaled depth maps from single rgb images," Proceedings of the IEEE International Conference on Computer Vision, 2017, 3372-3380.
Liu et al., "Learning depth from single monocular images using deep convolutional neural fields," IEEE transactions on pattern analysis and machine intelligence, Dec. 2015, 38(10):2024-39.
Mahjourian et al., "Unsupervised learning of depth and ego-motion from monocular video using 3d geometric constraints," Proceedings of the IEEE Conference on Computer Vision and Pattern Recognition, 2018, 5667-5675.
Pilzer et al., "Unsupervised adversarial depth estimation using cycled generative networks," 2018 International Conference on 3D Vision (3DV), Sep. 2018, 587-595.
Ranjan et al., "Adversarial collaboration: Joint unsupervised learning of depth, camera motion, optical flow and motion segmentation." CoRR, Submitted on May 2018, arXiv:1805.09806v1, 16 pages.
Ranjan et al., "Competitive collaboration: Joint unsupervised learning of depth, camera motion, optical flow and motion segmentation," Proceedings of the IEEE/CVF Conference on Computer Vision and Pattern Recognition, 2019, 12240-12249.
Ummenhofer et al., "Demon: Depth and motion network for learning monocular stereo," Proceedings of the IEEE Conference on Computer Vision and Pattern Recognition, 2017, 5038-5047.
Vijayanarasimhan et al., "Sfm-net: Learning of structure and motion from video," CVPR, 2017, 9 pages.
Wang et al., "Designing deep networks for surface normal estimation," Proceedings of the IEEE Conference on Computer Vision and Pattern Recognition, 2015, 539-547.
Wang et al., "Image quality assessment: from error visibility to structural similarity," IEEE transactions on image processing, Apr. 2004, 13(4):600-12.
Wang et al., "Learning depth from monocular videos using direct methods," Proceedings of the IEEE Conference on Computer Vision and Pattern Recognition, 2018, 2022-2030.
Wise et al., "Fetch and freight: Standard platforms for service robot applications," Workshop on autonomous mobile service robots, Jul. 2016, 6 pages.
Yang et al., "Every pixel counts: Unsupervised geometry learning with holistic 3d motion understanding," Proceedings of the European Conference on Computer Vision (ECCV) Workshops, 2018, 17 pages.

(56) References Cited

OTHER PUBLICATIONS

Yang et al., "Lego: Learning edge with geometry all at once by watching videos," Proceedings of the IEEE conference on computer vision and pattern recognition, 2018, 225-234.
Yang et al., "Unsupervised learning of geometry with edge-aware depth-normal consistency," arXiv preprint arXiv:1711.03665, Nov. 2017, 10 pages.
Yin et al., "Geonet: Unsupervised learning of dense depth, optical flow and camera pose," Proceedings of the IEEE conference on computer vision and pattern recognition, 2018, 1983-1992.
Zhan et al., "Unsupervised learning of monocular depth estimation and visual odometry with deep feature reconstruction," Proceedings of the IEEE Conference on Computer Vision and Pattern Recognition, 2018, 340-349.
Zhou et al., "Unsupervised learning of depth and ego-motion from video," Proceedings of the IEEE conference on computer vision and pattern recognition, 2017, 1851-1858.
Office Action in Chinese Appln. No. 201980057913.8, dated Mar. 18, 2024, 26 pages (with English translation).
Pei-yi et al., "Image Segmentation Algorithm Based on Mathematic Morphology and its Application for Fruit Grading," Science, Technology and Engineering, Dec. 2013, 13(34):10375-10380 (with English abstract).

\* cited by examiner

UNSUPERVISED DEPTH PREDICTION NEURAL NETWORKS

CROSS-REFERENCE TO RELATED APPLICATION

This application is a continuation of U.S. patent application Ser. No. 17/272,419, filed Mar. 1, 2021, which is a National Stage Application under 35 U.S.C. § 371 and claims the benefit of International Application No. PCT/US2019/049643, filed on Sep. 5, 2019, which claims priority to U.S. Provisional Application Ser. No. 62/727,502, filed on Sep. 5, 2018. The disclosure of the prior application is considered part of and is incorporated by reference in the disclosure of this application.

BACKGROUND

This specification relates to processing images using neural networks.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification describes a neural network system implemented as computer programs on one or more computers in one or more locations that includes a camera motion estimation neural network, an object motion estimation neural network, and a depth prediction neural network.

Particular embodiments of the subject matter described in this specification can be implemented so as to realize one or more of the following advantages. The subject matter described in this specification is generally directed to unsupervised learning techniques that allow a neural network system to predict depth and ego-motion directly from monocular videos more accurately and more efficiently than conventional approaches. While precise depth prediction for moving objects and precise ego-motion estimation are crucial for many odometry-based tasks, i.e., tasks that require the use of data from motion sensors to estimate change in position over time (e.g., robot navigation in dynamic scenes), prior work mainly focuses on camera ego-motion, leaving object motions unaddressed. In contrast, the described techniques explicitly model individual objects' motion in 3D together with camera ego-motion, thereby producing more precise depth and ego-motion estimation results.

In addition, prior work that employs supervised learning methods requires expensive depth sensors, which may not be readily available in most robotics scenarios and may introduce their own sensor noise. In contrast, the subject matter described herein addresses unsupervised learning of scene depth, camera motions and objection motions where supervision is provided by monocular videos taken by a camera—the least expensive, least restrictive, and most ubiquitous sensor for robotics. No additional supervision or sensors are necessary. This ensures that training data for the training of depth, object motion and camera motion neural networks is readily available, i.e., because large quantities of unlabeled monocular videos can be easily gathered during the course of normal operation of a robotic agent. Thus, the techniques described herein are applicable in most robotics scenarios.

Furthermore, the techniques described herein explicitly model 3D motions of individual moving objects in the scene as depicted in input images, together with camera ego-motion. By introducing the local structure of the input images into the learning process, the techniques enable the neural network system to adapt to new environments by learning with an online refinement (also referred to as "online fusion") of multiple frames. During online fusion mode, the neural network system can perform training and inference together. By using online fusion mode, even with very limited temporal resolution (for example, three-frame or three-image sequences), the neural network system can still significantly increase the quality of depth predictions both qualitatively and quantitatively. Having this low temporal resolution allows the described method to run online in real-time, with a negligible delay of a single frame/image. During the online fusion mode, the neural network system can run one or more optimization steps to update current values of parameters of the neural networks as if it were in the training mode before or after computing a desired output. In particular, the online fusion is run for N steps with are effectively fine-tuning one or more neural network models of the neural network system on-the-fly. N determines a good compromise between exploiting the online tuning sufficiently and preventing over-training with can cause artifacts. The online fusion approach can be seamlessly applied to any neural network model described in this application. Online fusion allows these neural networks to learn depth and ego-motions of unknown environments. This enables transfer learning across environments, for example, by transferring models trained on data collected for robot navigation in urban scenes to indoor navigation settings.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a neural network system implemented as computer programs on one or more computers in one or more locations that includes a camera motion estimation neural network, an object motion estimation neural network, and a depth prediction neural network.

Figure 1:
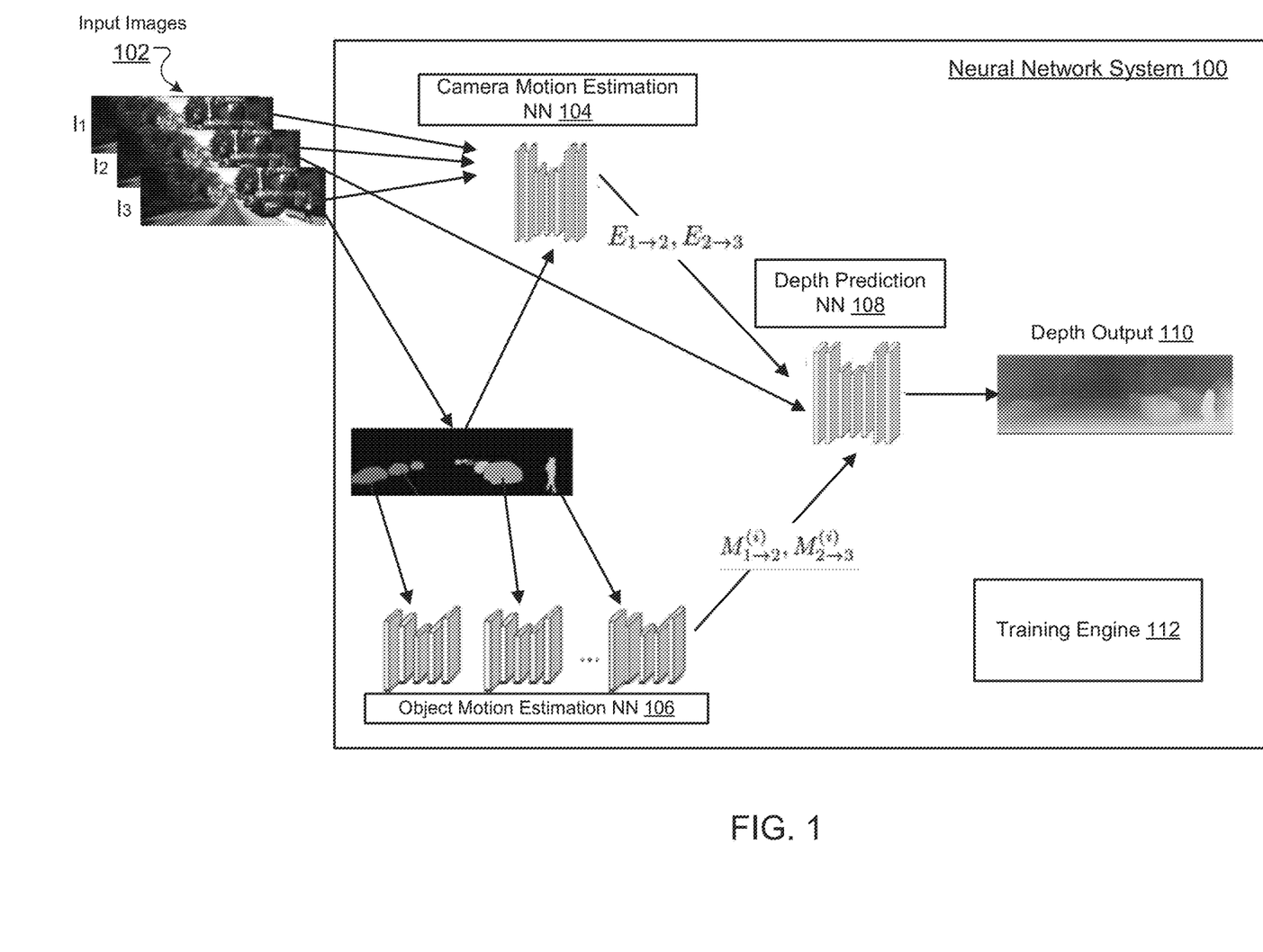
FIG. 1 shows an architecture of an example neural network system.

FIG. 1 shows an example architecture of a neural network system 100. The neural network system 100 is an example of a system implemented as computer programs on one or more computers in one or more locations, in which the systems, components, and techniques described below can be implemented. Generally, the neural network system 100 is configured to process a sequence of input images to generate depth and motion outputs for the input images.

As shown in FIG. 1, the neural network system 100 includes a camera motion estimation neural network 104 (also referred to as "camera motion NN 104" for simplicity), an object motion estimation neural network 106 (or "object motion NN 106"), and a depth prediction neural network 108 (or "depth NN 108"). Each of the camera motion NN 104, the object motion NN 106, and the depth NN 108 may include one or more convolutional neural network layers. In some implementations, the camera motion NN 104, the object motion NN 106, and the depth NN 108 are fully convolutional neural networks.

Example architectures of the camera motion NN 104 are described in Zhou, T.; Brown, M.; Snavely, N.; and Lowe, D. 2017. "Unsupervised learning of depth and ego-motion from video." Conference on Computer Vision and Pattern Recognition (CVPR).

Example architectures of the depth NN 108 are described in Zhou, T.; Brown, M.; Snavely, N.; and Lowe, D. 2017, "Unsupervised learning of depth and ego-motion from video," CVPR; and in Godard, C.; Aodha, O. M.; and Brostow, G. J. 2017, "Unsupervised monocular depth estimation with left-right consistency," CVPR.

In some implementations, the architecture of the object motion NN 106 is the same as the camera motion NN 104 but with different parameters because the object motion NN 106 is configured to learn objects' motion.

An example of the object motion NN 106 is a convolutional neural network that has 7 convolutional neural network layers followed by a 1×1 convolution followed by a mean that is applied to the output of the 1×1 convolution. For example, the 1×1 convolution outputs 6 outputs and the mean is applied to the 6 outputs to obtain a 6-dimensional vector. Alternatively, the object motion NN 106 can have more or fewer neural network layers, can use a fully-connected layer and can have other changes such as smaller dimensions.

The system 100 is configured to receive a sequence of images 102 and to process the sequence of images 102 using each of the neural networks 104, 106 and 108 to generate a respective depth or motion output.

The sequence of input images 102 may include frames of video being captured by the camera of a robotic agent. As another example, the sequence of input images 102 may include frames of a monocular video captured by a camera of a mobile device (e.g., by a camera of a hand-held commercial phone while a user of the phone is riding a bicycle). Each of the input images include one or more potential objects (e.g., a car, truck, motorbike, bicycle, pedestrian, and animal).

In some implementations, the sequence of images 102 may include consecutive frames of a video. However, the sequence 102 does not necessarily have to include all of the frames from the video. For example, in some implementations, the sequence 102 may include every other frame of the video.

The depth NN 108 is configured to receive an image from the sequence 102 and to process the image to generate a depth output for the image in accordance with current values of parameters of the depth NN 108. In some implementations, the depth NN 108 is configured to process each of the images in the sequence 102 to generate a respective depth output for each image. In the example of FIG. 1, the system 100 receives a sequence of three images ($I_1$, $I_2$, $I_3$). The depth NN 108 receives image $I_2$ as input and processes the image $I_2$ to generate a depth output $D_2$.

A depth output generated by the depth NN 108 for a given image is a depth map that includes a predicted depth value for each pixel of multiple pixels in the given image, e.g., for all of the pixels or some predetermined proper subset of the pixels. The depth value of a pixel is a representation of a perpendicular distance between (i) a plane in which the given image is recorded, and (ii) a scene depicted at the pixel (for example, the actual or virtual location of an object or part of an object that the pixel depicts). The plane in which the image is recorded may be a focal plane, for example, the focal plane of a camera of a robotic agent or the focal plane of a camera of a mobile device.

The camera motion NN 104 is generally configured to process a pair of images to generate a camera motion output that characterizes motion of the camera between the two images in accordance with current values of parameters of the camera motion NN 104. Because there are potential moving objects in the input images in the sequence 102, to accurately estimate motion of the camera between the input images, the system 100 first masks out object motions from the input images. To do this, the system 100 generates, for each of the input images, a respective background image that includes portions of the input image that do not depict any of the potential objects in the input image. The system 100 then processes the background images using the camera motion NN 104 to generate, for each pair of input images in the sequence 102, a respective camera motion output that characterizes motion of the camera between the two input images in the pair. A camera motion output is an ego-motion vector that defines rotation and translation of the camera from its point of view while taking the first image in the pair of input images to its point of view while taking the second image in the pair. For example, the ego-motion vector includes three values for three translation components $t_x$, $t_y$, $t_z$ and three values for three rotation components $r_x$, $r_y$, $r_z$.

To illustrate how the system 100 generates a respective background image for each of the input images in the sequence 102, let $(S_{i,1}, S_{i,2}, S_{i,3}) \in \mathbb{N}^{H \times W}$ denote an instance-aligned object segmentation masks per each potential object i in the sequence ($I_1$, $I_2$, $I_3$), where H×W is the size of the input images, $i \in \{1, 2, \ldots, N\}$ where N is the number of potential objects in each of the input images in the sequence. In order to compute camera motion, object motions are masked out of the input images first. More specifically, the system 100 generates a background segmentation mask by taking a complement of a union of binary object segmentation masks $S_i$ for the potential objects in the input image as follows:

$$O_0(S) = 1 - \cup_i S_i, \quad (1)$$

where $O_j(S) = S_{i,j} > 0$ returns a binary object segmentation mask only for object j. In particular, a binary segmentation mask $S_j$ includes a matrix in which each element of the matrix corresponds to a respective pixel in the input images, and each element may have a value 1 or 0. If an element of the matrix has a value 1, the corresponding pixel in the input images belongs to the object j. If an element of the matrix has a value 0, the corresponding pixel in the input image does not belong to the object j. To generate the background segmentation mask, the system 100 takes a union of all binary object segmentation masks and then determines an inverse of the union to obtain an area which does not contain any potential moving objects.

The system 100 generates a combined background segmentation mask V by taking a pixel-wise product of the background segmentation masks generated for input images in the sequence:

$$V = O_0(S_1) \odot O_0(S_2) \odot O_0(S_3), \quad (2)$$

where $\odot$ denotes an element-wise multiplication operation.

The system 100 generates the respective background image for each input image by taking a pixel-wise product of the combined background segmentation mask and the input image. The resulting sequence of background images are denoted as $I_1 \odot V, I_2 \odot V, I_3 \odot V$.

The system 100 provides the sequence of background images to the camera motion NN 104 as input. The camera motion NN 104 is configured to process the sequence of background images to generate a camera motion output as follows:

$$E_{1 \to 2}, E_{2 \to 3} = \psi_E(I_1 \odot V, I_2 \odot V, I_3 \odot V) \quad (3)$$

where $\psi_E$ denotes the camera motion NN 104. The camera motion output includes (i) a first camera motion estimate $E_{1 \to 2}$ that represents the motion of the camera between the first input image hand the second input image $I_2$, and (ii) a second camera motion estimate $E_{2 \to 3}$ that represents the motion of the camera between the second input image $I_2$ and the third input image $I_3$. More specifically, the first camera motion estimate E is a first transformation matrix that transforms the position and orientation of the camera from its point of view while taking the first input image to its point of view while taking the second input image. The second camera motion estimate $E_{2 \to 3}$ is a second transformation matrix that transforms the position and orientation of the camera from its point of view while taking the second input image to its point of view while taking the third input image.

After processing the background images to generate the camera motion output, the system 100 generates, using the object motion NN 106, a respective object motion output for each of the potential objects based on the sequence of input images and the camera motion output in accordance with current values of parameters of the object motion NN 106. The respective object motion output characterizes movements of the potential object between its positions as appeared in the input images.

In particular, the system 100 generates a sequence of warped images, denoted as $(\hat{I}_{1 \to 2}, I_2, \hat{I}_{3 \to 2})$, by applying a warping operation $\emptyset$ on the sequence of input images using the camera motion output. More specifically, the warping operation $\emptyset$ is differentiable and can be expressed as follows:

$$\phi(I_i, D_j, E_{i \to j}) \to \hat{I}_{i \to j}, \quad (4)$$

where $I_{i \to j}$ is the reconstructed $j^{th}$ image that is generated by warping an input image $I_i$ into $I_j$ given corresponding depth output $D_j$ of input image $I_j$ and a camera motion estimate $E_{i \to j}$. For each warped image in the sequence of warped images $(\hat{I}_{1 \to 2}, I_2, \hat{I}_{3 \to 2})$, the system 100 generates a respective warped segmentation mask, denoted as $(\hat{S}_{1 \to 2}, S_2, \hat{S}_{3 \to 2})$.

For each of the potential objects, the object motion output $M^{(i)}$ of the $i^{th}$ object is computed as:

$$M_{1 \to 2}^{(i)}, M_{2 \to 3}^{(i)} = \psi_M(\hat{I}_{1 \to 2} \odot O_i(\hat{S}_{1 \to 2}), I_2 \odot O_i(S_2), \hat{I}_{3 \to 2} \odot O_i(\hat{S}_{3 \to 2})), \quad (5)$$

where $\psi_M$ represents the object motion NN 106 and $\odot$ denotes an element-wise multiplication operation. $M_{1 \to 2}^{(i)}$ is a transformation matrix that represents motion of the potential object between its first position as appeared in the first input image $I_1$ and its second position as appeared in the second input image $I_2$. $M_{2 \to 3}^{(i)}$ is a transformation matrix that represents motion of the potential object between its second position as appeared in the second input image $I_2$ and its third position as appeared in the third input image $I_3$.

While $M_{1 \to 2}^{(i)}, M_{2 \to 3}^{(i)} \in R^6$ represent object motions, they are modeling how the camera would have moved in order to explain the object appearance, rather than the object motion directly. As an example, if a car is crossing an intersection from left to right, a transformation matrix would move the camera from the right to the left such that, when an observer is looking at the car only, the car appears to have moved to the right as it did.

To efficiently generate depth and motion outputs for a sequence of images, the neural network system 100 includes a training engine 112, which is a software-based system, subsystem, or process that is programmed to jointly train the camera motion NN 104, the depth NN 108 and the object motion NN 106 using an unsupervised learning technique. Generally, the training engine 118 will be implemented as one or more software modules or components, installed on one or more computers in one or more locations. In some cases, one or more computers will be dedicated to a particular engine; in other cases, multiple engines can be installed and running on the same computer or computers.

To jointly train the camera motion NN 104, the depth NN 108 and the object motion NN 106, the training engine 112 determines an estimate of a gradient of a loss function based on the sequence of warped images, the sequence of object segmentation masks, the combined background segmentation mask, the object motion outputs, the camera motion output, and the depth output generated by the system 100 and the neural networks 104, 106, and 108 as described above. The training engine 112 backpropagates the estimate of the gradient of the loss function to jointly adjust the current values of the parameters of camera motion NN 104, the depth NN 108 and the object motion NN 106.

An example process for constructing a loss function for jointly training the camera motion NN 104, the depth NN 108 and the object motion NN 106 is described in detail below with reference to FIG. 2.

After the values of parameters of the neural networks 104, 106 and 108 have been updated, the system 100 can process one or more new input images using one or more of the neural networks 104, 106 and 108 to generate a desired output. For example, the system 100 can process a new input image using the depth NN 108 to generate a depth output 110 for the new input image in accordance with updated values of parameters of the depth NN 108.

Figure 2:
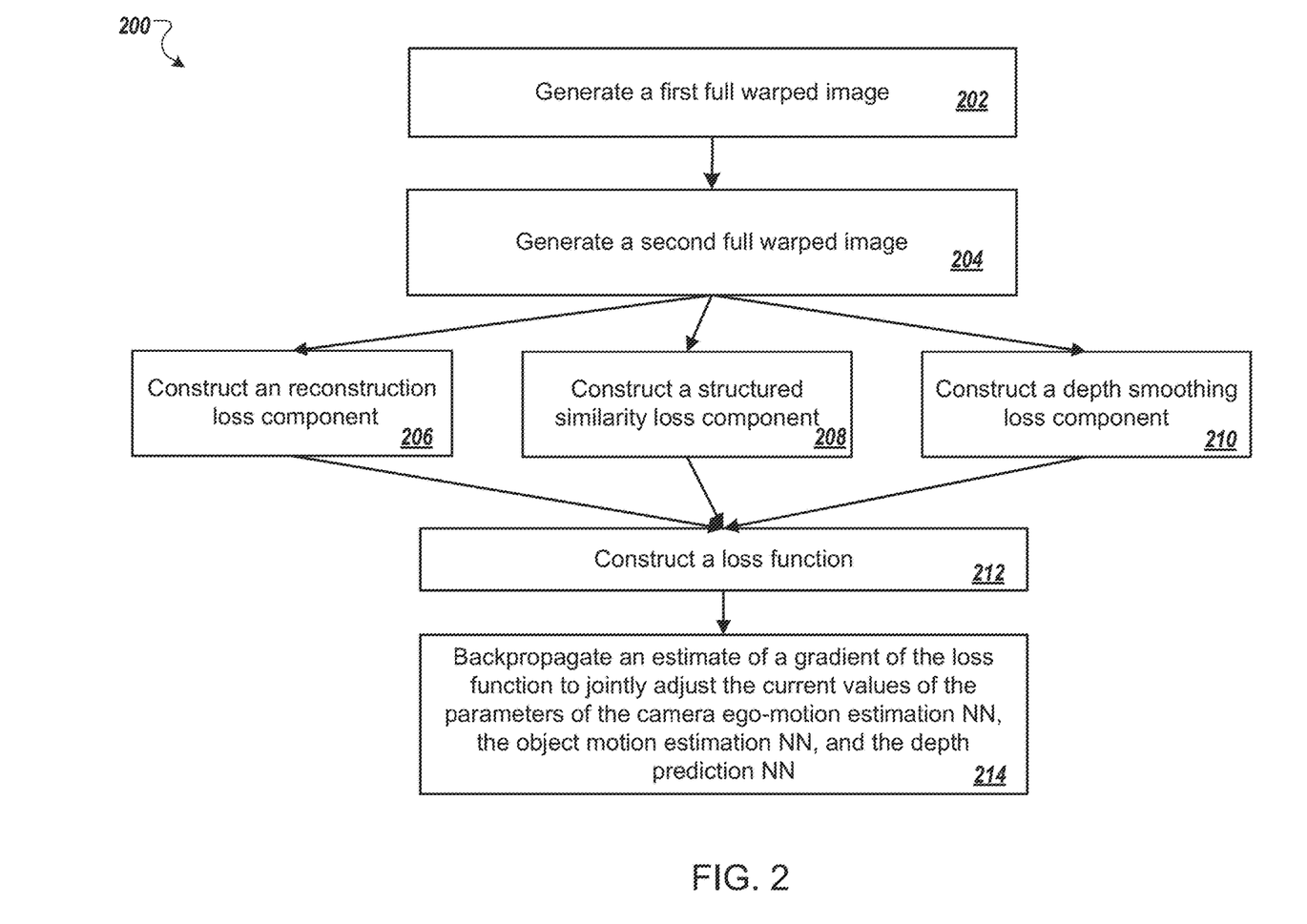
FIG. 2 is a flow diagram of an example process for constructing a loss function for jointly training a camera motion estimation neural network, an object motion estimation neural network, and a depth prediction neural network.

FIG. 2 is a flow diagram of an example process for constructing a loss function for jointly training a camera motion estimation neural network, an object motion estimation neural network, and a depth prediction neural network. For convenience, the process 200 will be described as being performed by a system of one or more computers located in one or more locations. For example, a neural network system, e.g. the neural network system 100 of FIG. 1, appropriately programmed in accordance with this specification, can perform the process 200.

The system generates a first full warped image (step 202) by performing the following operations.

For each potential object in one or more potential objects, the system applies an inverse warping operation on the first warped image in the sequence of warped images, where the operation is parameterized by the depth output $D_2$ and the first object motion estimate of the potential object to obtain $\hat{I}_{1 \to 2}^{(i)}$:

$$\hat{I}_{1 \to 2}^{(i)} = \phi(\hat{I}_{1 \to 2}, D_2, M_{1 \to 2}^{(i)}) \tag{6}$$

The system computes a pixel-wise product of and a respective binary object segmentation mask $O_i(S_2)$ for object i to generate a first temporary warped object image, denoted as $\hat{I}_{1 \to 2}^{(i)} \odot O_i(S_2)$.

The system generates a first temporary warped background image by combining the first warped image in the sequence of warped images and the combined background segmentation mask. The first temporary warped background image is denoted as $\hat{I}_{1 \to 2} \odot V$.

The system generates the first full warped image, denoted as $\hat{I}_{1 \to 2}^{(F)}$ by combining the first temporary warped background image and the first temporary warped object images as follows:

$$\hat{I}_{1 \to 2}^{(F)} = \underbrace{\hat{I}_{1 \to 2} \odot V}_{\text{Gradient w.r.t } \psi_E, \phi} + \sum_{i=1}^{N} \underbrace{\hat{I}_{1 \to 2}^{(i)} \odot O_i(S_2)}_{\text{Gradient w.r.t } \psi_M, \phi} \tag{7}$$

Similarly, the system generates a second full warped image (step 204) by performing the following operations.

For each potential object i in one or more potential objects, the system applies the inverse warping operation on the third warped image in the sequence of warped images, where the operation is parameterized by the depth output $D_2$ and an inverse of the second object motion estimate of the potential object to obtain $\hat{I}_{3 \to 2}^{(i)}$:

$$\hat{I}_{3 \to 2}^{(i)} = \phi(\hat{I}_{3 \to 2}, D_2, M_{2 \to 3}^{(i)-1}) \tag{8}$$

The system computes a pixel-wise product of $\hat{I}_{3 \to 2}^{(i)}$ and a respective binary object segmentation mask $O_i(S_2)$ for object i to generate a second temporary warped object image for each object i, denoted as $\hat{I}_{3 \to 2}^{(i)} \odot O_i(S_2)$.

The system generates a second temporary warped background image by combining the third warped image in the sequence of warped images and the combined background segmentation mask. The second temporary warped background image is denoted as $\hat{I}_{3 \to 2} \odot V$.

The system generates the second full warped image, denoted as $\hat{I}_{3 \to 2}^{(F)}$ by combining the second temporary warped background image and the second temporary warped object images as follows:

$$\hat{I}_{3 \to 2}^{(F)} = \underbrace{\hat{I}_{3 \to 2} \odot V}_{\text{Gradient w.r.t } \psi_E, \phi} + \sum_{i=1}^{N} \underbrace{\hat{I}_{3 \to 2}^{(i)} \odot O_i(S_2)}_{\text{Gradient w.r.t } \psi_M, \phi} \tag{9}$$

After generating the first and second full warped images, the system constructs components of the loss function that is used for training as follows.

The system constructs a reconstruction loss between the first and second full warped images and the second input image (step 206). The reconstruction loss is computed as the minimum reconstruction loss between warping from either the first input image or the third input image into the second image (i.e., the middle image in the sequence of three images):

$$L_{rec} = \min(\|\hat{I}_{1 \to 2}^{(F)} - I_2\|, \|\hat{I}_{3 \to 2}^{(F)} - I_2\|) \tag{10}$$

to avoid penalization due to significant occlusion/disocclusion effects.

The system constructs a structured similarity loss that represents a dissimilarity between the first and second full warped images and the second image (step 208). The system can construct the structured similarity loss as follows:

$$L_{ssim} = \min(1 - \text{SSIM}(\hat{I}_{1 \to 2}^{(F)}, I_2), 1 - \text{SSIM}(\hat{I}_{3 \to 2}^{(F)}, I_2)) \tag{11}$$

where SSIM(x,y) is an index that represents the similarity between images patches extracted from image x and image patches extracted from image y. An example form of the SSIM(x,y) index is described in detail in Wang, Z.; Bovik, A. C.; Sheikh, H. R.; and Simoncelli, E. P. 2004. "Image quality assessment: from error visibility to structural similarity." Transactions on Image Processing.

The system constructs a depth smoothing loss defined by the depth output and the second input image (step 210). The depth smoothing loss is an image-aware smoothing loss over depth predictions. It enforces smoothness in uniform color regions while allowing depth to vary around image edges:

$$L_{sm} = \sum_{i,j} \|\partial_x D^{ij}\| e^{-\|\partial_x I^{ij}\|} + \|\partial_y D^{ij}\| e^{-\|\partial_y I^{ij}\|} \tag{12}$$

where $I^{i,j}$ denotes an image pixel at coordinates (i, j) of the given image I, $\bar{D}^{ij}$ is the estimated depth corresponding with and $\partial_x$, $\partial_y$ are the gradients. By considering the gradients of the image I, the depth smoothness loss allows for sharp changes in depth at pixel coordinates where there are sharp changes in the image. The partial derivatives $\partial_x$, $\partial_y$ are for extracting the image edges in horizontal and vertical directions. They are applied to both image and the depth map, allowing to have a smooth depth map, i.e. with smaller in absolute value on the edges. If the image does have an edge at a particular location, the depth is not expected to be as smooth there, i.e. it will be penalized less for these areas.

The system constructs a loss function (step 214). The loss function is a weighted combination of (i) the reconstruction loss, (ii) the structured similarity loss, and (iii) the depth smoothing loss. For example, the loss function can have the following form:

$$L = \alpha_1 \sum_{i=0}^{3} L_{rec}^{(i)} + \alpha_2 L_{ssim}^{(i)} + \alpha_3 \frac{1}{2^i} L_{sm}^{(i)}, \tag{13}$$

where $\alpha_i$ are predetermined hyper-parameters. The total loss L can be applied on 4 scales, i.e., the losses can be reapplied to the image and three sub-sampled versions of the image).

In some implementations, to improve the accuracy of depth predictions, the system includes an object size loss in the above loss function to impose object size constraints.

By imposing object size constraints, the system can address a common issue pointed out in previous work, that objects such as cars moving in front at roughly the same speed often get projected into infinite depth. This is because the object in front shows no apparent motion, and if the network estimates it as being infinitely far away, the re-projection error is almost reduced to zero which is preferred to the correct case. Previous work has pointed out this significant limitation but offered no solution except for augmenting a training dataset with stereo images. However, stereo is not nearly as widely available as monocular video, which will limit the method's applicability.

It is observed that if the model has no knowledge about object scales, it could explain the same object motion by placing an object very far away and predicting very significant motion, assuming it to be very large, or placing it very close and predicting little motion, assuming it to be very small. By imposing object size constraints, the system allows the depth prediction neural network to learn objects' scales as part of the training process, thus being able to model objects in 3D. Assuming a weak prior on the height of certain objects, e.g. a car, an approximate depth estimation for it given its segmentation mask and the camera intrinsics using $$D_{approx}(p; h) \approx f_y \frac{p}{h}$$

can be obtained, where $f_y \in \mathbb{R}$ is the focal length, $p \in \mathbb{R}$ is height prior in world units, and $h \in \mathbb{N}$ is a height of the respective segmentation blob in pixels.

In practice, it is not desirable to estimate such constraints by hand, and the depth prediction scale produced by the network is unknown. Therefore, the system allows the depth prediction neural network to learn all constraints simultaneously without requiring additional inputs.

Given the above, the system constructs the object size loss term on the scale of each object i(i=1, ..., N) in an input image. Let t(i): $\mathbb{N} \to \mathbb{N}$ define a category ID for any object i, and $p_j$ be a learnable height prior for each category ID j. Let D be a depth map describing the depth estimate of each of the potential objects, and S be the corresponding object outline mask, and $\overline{D}$ is the mean estimated depth of the second input image. The system applies the object size loss that represents the difference between (i) the depth prediction of each of the potential objects based on the output of the depth NN 108 and (ii) an approximate depth estimate at the location of the potential object based on a size of the potential object in real-world as follows:

$$L_{sc} = \sum_{i=1}^{N} \left\| \frac{D \odot O_i(S)}{\overline{D}} - \frac{D_{approx}(p_{t(i)}; h(O_i(S)))}{\overline{D}} \right\|. \quad (14)$$

By using $\overline{D}$ to scale, the system can reduce a potential issue of trivial loss reduction by jointly shrinking priors and the depth prediction range. Thus, the loss $L_{sc}$ can successfully balance both Pj for every object category and the depth ranges that are predicted for objects within that class. It can efficiently exploit size consistency and address common degenerative cases in a fully monocular training setup without requiring any form of supervision (or weak supervision) in 3D. In some implementations, all motion models can be trained with $L_{sc}$ from the very beginning. In some implementations, this additional loss can successfully correct wrong depth estimates when being applied to already trained models, in which case it works by correcting depth for moving objects.

The object size loss can effectively prevent all segmented objects to degenerate into infinite depth, and forces the network to produce not only a reasonable depth but also matching object motion estimates.

After constructing the loss function with its loss components, the system generates an estimate of a gradient of the loss function and backpropagates the estimate of the gradient to jointly adjust the current values of depth parameters of the depth network and the current values of motion parameters of the camera motion network (step 218). The system can jointly adjust the current values of the depth and motion parameters to minimize the loss function by using mini-batch stochastic optimization or stochastic gradient optimization method.

Figure 3:
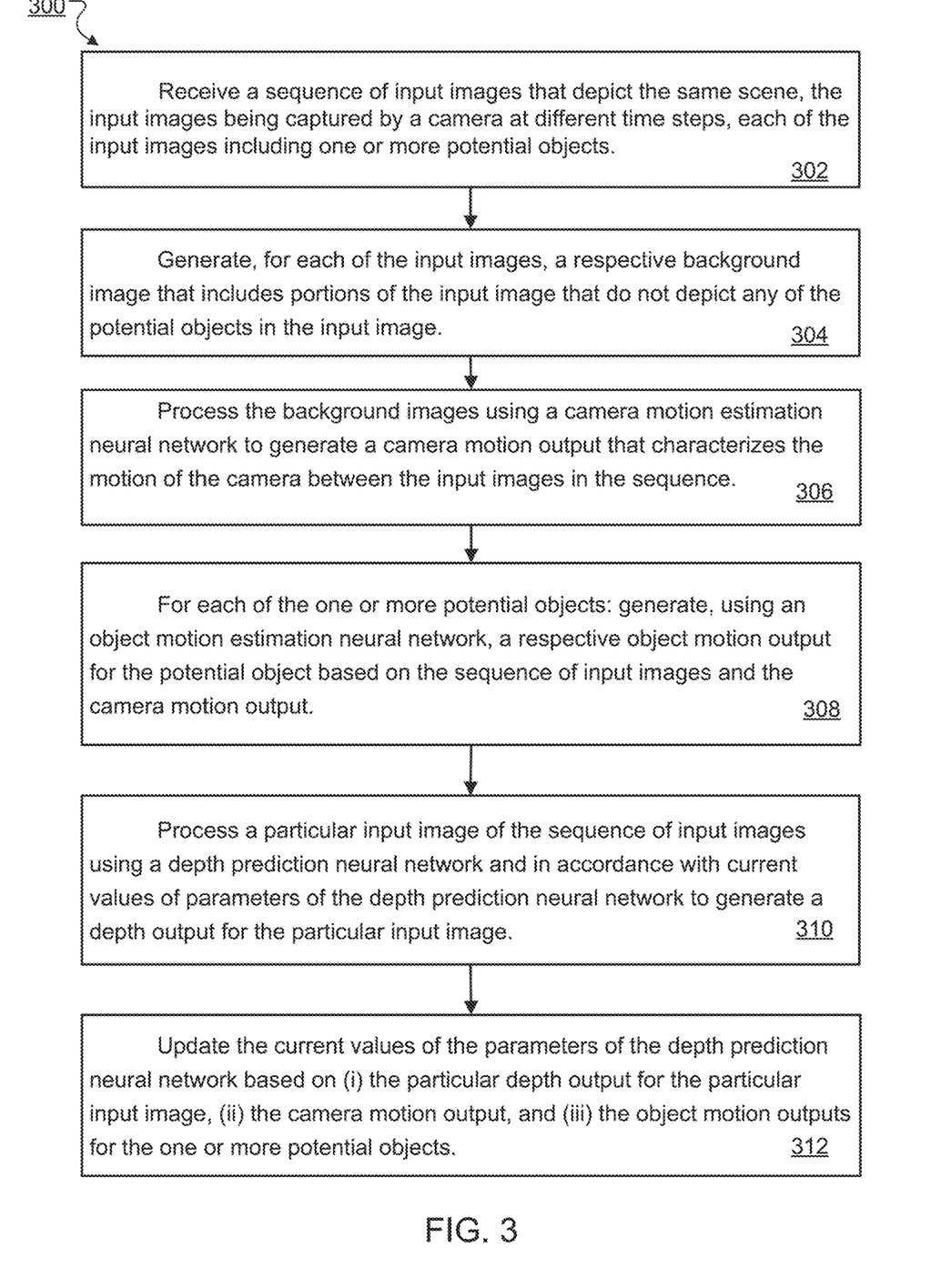
FIG. 3 is a flow diagram of an example process for training the camera motion estimation neural network, the object motion estimation neural network, and the depth prediction neural network.

FIG. 3 is a flow diagram of an example process 300 for training the camera motion estimation neural network, the object motion estimation neural network, and the depth prediction neural network. For convenience, the process 300 will be described as being performed by a system of one or more computers located in one or more locations. For example, a neural network system, e.g., the neural network system 100 of FIG. 1, appropriately programmed in accordance with this specification, can perform the process 300.

The system receives a sequence of input images that depict the same scene (step 302). The input images are captured by a camera at different time steps. Each of the input images includes one or more potential objects.

For each input image in the sequence of input images, the system generates a respective background image that includes portions of the input image that do not depict any of the potential objects in the input image (step 304).

In particular, the system generates, for each potential object in the input image, a respective object segmentation mask for the potential object. The system generates a background segmentation mask for the input image by taking a complement of a union of the object segmentation masks for the potential objects in the input image. The system generates the respective background image for the input image by taking a pixel-wise product of a combined background segmentation mask and the input image. The combined background segmentation mask is a pixel-wise product of the background segmentation masks generated for the input images in the sequence.

The system processes the background images using a camera motion estimation neural network to generate a camera motion output that characterizes the motion of the camera between the input images in the sequence (step 306). The camera motion estimation neural network is configured to process the background images to generate the camera motion output in accordance with current values of parameters of the camera motion estimation neural network.

The camera motion output includes (i) a first camera motion estimate that represents the motion of the camera between the first input image and the second input image, and (ii) a second camera motion estimate that represents the motion of the camera between the second input image and the third input image. More specifically, the first camera motion estimate is a first transformation matrix that transforms the position and orientation of the camera from its point of view while taking the first input image to its point of view while taking the second input image. The second camera motion estimate is a second transformation matrix that transforms the position and orientation of the camera from its point of view while taking the second input image to its point of view while taking the third input image.

For each of the one or more potential objects, the system generates, using an object motion estimation neural network, a respective object motion output for the potential object based on the sequence of input images and the camera motion output (step 308). The respective object motion output characterizing movements of the potential object between its positions as appeared in the input images.

In particular, the respective object motion output for the potential object includes (i) a first object motion estimate which is a third transformation matrix that represents motion of the potential object between its first position as appeared in the first input image and its second position as appeared in the second input image, and (ii) a second object motion estimate which is a fourth transformation matrix that represents motion of the potential object between its second position as appeared in the second input image and its third position as appeared in the third input image. More specifically, each of the third and fourth transformation matrices represents a motion of the potential object by describing a motion of the camera such that when applied and when the potential object is considered static, the potential object appears to have moved appropriately. As an example, if a car is crossing an intersection from left to right, a transformation matrix would move the camera from the right to the left such that, when only looking at the car, the car appears to have moved to the right as it did.

The system processes a particular input image of the sequence of input images using a depth prediction neural network and in accordance with current values of parameters of the depth prediction neural network to generate a depth output for the particular input image (step 310).

A depth output generated by the depth prediction neural network for a given image is a depth map that includes a predicted depth value for each pixel of multiple pixels in the given image. The depth value of a pixel is a representation of a perpendicular distance between (i) a plane in which the given image is recorded, and (ii) a scene depicted at the pixel (for example, the actual or virtual location of an object or part of an object that the pixel depicts). The plane in which the image is recorded may be a focal plane, for example, the focal plane of a camera of a robotic agent or the focal plane of a camera of a mobile device.

The system updates the current values of the parameters of the depth prediction neural network based on (i) the particular depth output for the particular input image, (ii) the camera motion output, and (iii) the object motion outputs for the one or more potential objects (step 312).

In particular, the system determines an estimate of a gradient of a loss function based on the sequence of input images, the object motion outputs, the camera motion output, and the depth output. The system can construct the loss function using a method as described in detail above with reference to FIG. 2. The system backpropagates the estimate of the gradient of the loss function to jointly adjust the current values of the parameters of the camera motion estimation neural network, the object motion estimation neural network, and the depth prediction neural network.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system comprising one or more computers in one or more locations and one or more storage devices storing instructions that, when executed by one or more computers, cause the one or more computers to perform operations for online refinement of a depth prediction neural network during inference of the depth prediction neural network, the operations comprising:

performing one or more iterations of a set of inference operations, the set of inference operations comprising:

receiving a sequence of unseen input images that depict a same scene of a new environment, the sequence of input images comprising a first input image, a second input image, and a third input image, the input images being captured by a camera at different time steps, each of the input images including one or more potential objects;

generating, for each of the input images, a respective background image that includes portions of the input image that do not depict any of the potential objects in the input image;

processing the background images using a camera motion estimation neural network to generate a camera motion output that characterizes the motion of the camera between the input images in the sequence;

generating a sequence of warped images by applying a warping operation to the sequence of input images using the camera motion output, wherein each warped image is generated by applying the warping operation to two different images in the sequence;

for each of the one or more potential objects: generating, using an object motion estimation neural network, a respective object motion output for the potential object based on the sequence of warped images, the respective object motion output characterizing movements of the potential object between its positions as appeared in the input images; and processing a particular input image of the sequence of input images using a depth prediction neural network and in accordance with current values of parameters of the depth prediction neural network to generate a depth output for the particular input image; and after each iteration of the set of inference operations, performing online refinement of the depth prediction neural network by updating the current values of the parameters of the depth prediction neural network based on (i) the particular depth output for the particular input image, (ii) the camera motion output, and (iii) the object motion outputs for the one or more potential objects.

2. The system of claim 1, wherein the sequence of input images are frames of a video captured by the camera.

3. The system of claim 1, wherein the depth output comprises an estimated depth value for each pixel of a plurality of pixels in the second image that represents a respective distance of a scene depicted at the pixel from a focal plane of the second image.

4. The system of claim 1, wherein for each input image in the sequence of input images, generating a respective background image for the input image comprises:

generating a respective object segmentation mask for each of the potential objects in the input image, generating a background segmentation mask by taking a complement of a union of the object segmentation masks for the potential objects in the input image, and generating the respective background image for the input image by taking a pixel-wise product of a combined background segmentation mask and the input image, wherein the combined background segmentation mask is a pixel-wise product of the background segmentation masks generated for the input images in the sequence.

5. The system of claim 4, wherein updating the current values of the parameters of the depth prediction neural network comprises:

determine an estimate of a gradient of a loss function based on the sequence of warped images, the sequence of object segmentation masks, the combined background segmentation mask, the object motion outputs, the camera motion output, and the depth output, and backpropagate the estimate of the gradient of the loss function to jointly adjust the current values of the parameters of the camera motion estimation neural network, the object motion estimation neural network, and the depth prediction neural network.

6. The system of claim 5, wherein determining the estimate of the gradient of the loss function comprises:

generating a first full warped image by performing the following operations:

for each potential object in one or more potential objects, applying an inverse warping operation on the first warped image in the sequence of warped images, wherein the operation is parameterized by the depth output for the particular input image and the first object motion estimate of the potential object, and combining the result with the respective object segmentation mask to generate a first temporary warped object image, generating a first temporary warped background image by combining the first warped image in the sequence of warped images and the combined background segmentation mask, generating the first full warped image by combining the first temporary warped background image and the first temporary warped object images;

generating a second full warped image by performing the following operations:

for each potential object in one or more potential objects, applying the inverse warping operation on the third warped image in the sequence of warped images, wherein the operation is parameterized by the depth output for the particular input image and the second object motion estimate of the potential object, and combining the result with the respective object segmentation mask to generate a second temporary warped object image, generating a second temporary warped background image by combining the third warped image in the sequence of warped images and the combined background segmentation mask, generating the second full warped image by combining the second temporary warped background image and the second temporary warped object images; and wherein the loss function comprises (i) a first component that represents a reconstruction loss between the first and second full warped images and the second input image, (ii) a second component that represents a dissimilarity between the first and second full warped images and the second image, and (iii) a third component that represents a depth smoothing loss defined by the depth output and the second input image.

7. The system of claim 6, wherein the loss function further comprises an object size loss component that represents the difference between (i) the depth prediction of each of the potential objects based on the output of the depth prediction neural network, and (ii) an approximate depth estimate at the location of the potential object based on a size of the potential object in real-world.

8. The system of claim 1, wherein the instructions further comprise instructions that, when executed by the one or more computer, cause the one or more computers to:

after processing the background images to generate the camera motion output, generate a sequence of warped images by applying a warping operation on the sequence of input images using the camera motion output; and wherein for each of the one or more potential objects, generating a respective object motion output for the potential object comprises:

for each warped image in the sequence of warped images:

generating a respective warped segmentation mask of the potential object in the warped image, and generating a respective object image for the warped image by taking a pixel-wise product of the warped image and the respective warped segmentation mask; and processing, using the object motion estimation neural network, (i) the object image of the first warped image in the sequence of warped images, (ii) the second input image, and (iii) the object image of the third warped image in the sequence of warped images to generate the respective object motion output for the potential object.

9. The system of claim 1, wherein the camera motion output comprises (i) a first camera motion estimate that represents the motion of the camera between the first input image and the second input image and (ii) a second camera motion estimate that represents the motion of the camera between the second input image and the third input image.

10. The system of claim 9, wherein the first camera motion estimate is a first transformation matrix that transforms the position and orientation of the camera from its point of view while taking the first input image to its point of view while taking the second input image.

11. The system of claim 9, wherein the second camera motion estimate is a second transformation matrix that transforms the position and orientation of the camera from its point of view while taking the second input image to its point of view while taking the third input image.

12. The system of claim 1, wherein an object motion output for a potential object comprises (i) a first object motion estimate which is a third transformation matrix that represents motion of the potential object between its first position as appeared in the first input image and its second position as appeared in the second input image, and (ii) a second object motion estimate which is a fourth transformation matrix that represents motion of the potential object between its second position as appeared in the second input image and its third position as appeared in the third input image.

13. The system of claim 1, wherein the depth prediction neural network comprises one or more convolutional neural network layers.

14. The system of claim 1, wherein the camera motion estimation neural network comprises one or more convolutional neural network layers.

15. The system of claim 1, wherein the object motion estimation neural network comprises one or more convolutional neural network layers.

16. The system of claim 1, wherein the camera motion estimation neural network, the object motion estimation neural network, and the depth prediction neural network have been jointly trained using an unsupervised learning technique.

17. A computer-implemented method for online refinement of a depth prediction neural network during inference of the depth prediction neural network, the method comprising:

performing one or more iterations of a set of inference operations, the set of inference operations comprising:
receiving a sequence of unseen input images that depict a same scene of a new environment, the sequence of input images comprising a first input image, a second input image, and a third input image, the input images being captured by a camera at different time steps, each of the input images including one or more potential objects;

generating, for each of the input images, a respective background image that includes portions of the input image that do not depict any of the potential objects in the input image;

processing the background images using a camera motion estimation neural network to generate a camera motion output that characterizes the motion of the camera between the input images in the sequence;

generating a sequence of warped images by applying a warping operation to the sequence of input images using the camera motion output, wherein each warped image is generated by applying the warping operation to two different images in the sequence;

for each of the one or more potential objects: generating, using an object motion estimation neural network, a respective object motion output for the potential object based on the sequence of warped images and the camera motion output, the respective object motion output characterizing movements of the potential object between its positions as appeared in the input images;

processing a particular input image of the sequence of input images using a depth prediction neural network and in accordance with current values of parameters of the depth prediction neural network to generate a depth output for the particular input image; and after each iteration of the set of inference operations, performing online refinement of the depth prediction neural network by updating the current values of the parameters of the depth prediction neural network based on (i) the particular depth output for the particular input image, (ii) the camera motion output, and (iii) the object motion outputs for the one or more potential objects.

18. The method of claim 17, further comprising:
receiving an image as input; and
processing the image according to current values of parameters of the depth prediction neural network to generate an estimate of depth of the input image.

19. One or more non-transitory computer storage media encoded with instructions that, when executed by one or more computers, cause the one or more computers to perform operations for online refinement of a depth prediction neural network during inference of the depth prediction neural network, the operations comprising:

performing one or more iterations of a set of inference operations, the set of inference operations comprising:
receiving a sequence of unseen input images that depict a same scene of a new environment, the sequence of input images comprising a first input image, a second input image, and a third input image, the input images being captured by a camera at different time steps, each of the input images including one or more potential objects;

generating, for each of the input images, a respective background image that includes portions of the input image that do not depict any of the potential objects in the input image;

processing the background images using a camera motion estimation neural network to generate a camera motion output that characterizes the motion of the camera between the input images in the sequence;

generating a sequence of warped images by applying a warping operation to the sequence of input images using the camera motion output, wherein each warped image is generated by applying the warping operation to two different images in the sequence;

for each of the one or more potential objects: generating, using an object motion estimation neural network, a respective object motion output for the potential object based on the sequence of warped images and the camera motion output, the respective object motion output characterizing movements of the potential object between its positions as appeared in the input images;

processing a particular input image of the sequence of input images using a depth prediction neural network and in accordance with current values of parameters of the depth prediction neural network to generate a depth output for the particular input image; and after each iteration of the set of inference operations, performing online refinement of the depth prediction neural network by updating the current values of the parameters of the depth prediction neural network based on (i) the particular depth output for the particular input image, (ii) the camera motion output, and (iii) the object motion outputs for the one or more potential objects.

\* \* \* \* \*